United States Patent [19] [11] Patent Number: 4,564,242
Krude et al. [45] Date of Patent: Jan. 14, 1986

[54] WHEEL HUB ASSEMBLY

[75] Inventors: Werner Krude, Siegburg; Alfons Jordan, Hennef, both of Fed. Rep. of Germany

[73] Assignee: Uni-Cardan Aktiengesellschaft, Siegburg, Fed. Rep. of Germany

[21] Appl. No.: 545,749

[22] Filed: Oct. 26, 1983

[30] Foreign Application Priority Data

Oct. 27, 1982 [DE] Fed. Rep. of Germany ....... 3239802

[51] Int. Cl.⁴ .................... F16D 65/78; F16D 65/84; F16D 65/847
[52] U.S. Cl. .......................... 301/6 CF; 188/264 AA; 188/264 A; 188/71.6; 301/6 CS
[58] Field of Search ................. 301/6 CF, 6 E, 6 CS, 301/6 WB, 6 S; 188/264 A, 264 AA, 71.6

[56] References Cited

U.S. PATENT DOCUMENTS 2,109,722 3/1938 Fawick ............................. 301/6 CS
3,952,820 4/1976 Asberg ......................... 301/6 CS X

FOREIGN PATENT DOCUMENTS 3025757 7/1980 Fed. Rep. of Germany ... 301/6 CF
341778 1/1931 United Kingdom ................ 301/6 S Primary Examiner—Robert B. Reeves
Assistant Examiner—Mark J. Abate
Attorney, Agent, or Firm—Toren, McGeady, Stanger, Goldberg & Kiel

[57] ABSTRACT

A wheel hub assembly includes an internally ventilated brake disc. The brake disc is mounted on a flange-like extension of the inner bearing ring of the assembly. Slots are formed in the flange-like extension and the brake disc acts as a cover over the slots forming cooling channels extending radially outwardly in the wheel hub assembly to the cooling apertures in the radially outer part of the brake disc. A heat insulated cover disc can be positioned between the brake disc and the slots in the flange-like extension.

4 Claims, 2 Drawing Figures

WHEEL HUB ASSEMBLY

SUMMARY OF THE INVENTION

The present invention is directed to a wheel hub assembly with an integrated rotary constant velocity joint and a flanged-on brake disc. The assembly includes a wheel carrier with an outer bearing ring connected to the wheel carrier and an inner bearing ring provided with cooling channels.

A known wheel bearing in which the annular part of the wheel hub is provided with apertures for achieving a ventilation effect is disclosed in German Offenlegungsschrift No. 30 25 757.

In the arrangement set forth in the prior art, the openings for providing the ventilation or cooling effect are provided in a separate operation. As a result, the component containing the openings has greater length and the air flow cross-sections are relatively small so that a reduced ventilating or cooling action results.

Therefore, it is the primary object of the present invention to provide a wheel hub assembly which can be ventilated to improve the cooling action with a shorter length for the component forming the cooling channels. The invention is characterized by the fact that the operation of forming the channels does not result in any additional costs and it is possible to provide coolant channels or passages which have a relatively large cross-section for the cooling air flow.

Accordingly, the invention has the following characteristic features:

(a) a flange-like extension is formed on the inner bearing ring and is arranged to mount an internally ventilated brake disc, and the flange-like extension has uniformly circumferentially spaced, radially extending through-slots;

(b) the through-slots are located in the outside surface of the flange-like extension and the slots are covered along their length and at the circumference of the extension by the internally ventilated brake disc; and (c) the inner bearing ring has a central bore located inwardly of the flange-like extension and the bore is arranged to receive a cover plate containing beads corresponding to the slots with the beads extending radially inwardly into the cover plate.

An important feature of the wheel hub assembly embodying the present invention is that the slots in the flange-like extension are formed in the operation of forging the inner bearing ring and the cooling channels are completed by mounting the brake disc on the wheel hub assembly.

In another embodiment of the invention, a preferably heat-treated insulated cover disc can be positioned between the flange-like extension on the inner bearing ring and the internally ventilated brake disc.

The advantage of this feature is that the heat transmitted from the brake disc to the wheel hub, which is low because the two parts are in contact with one another only over the surfaces between the slots, is further reduced.

The various features of novelty which characterize the invention are pointed out with particularity in the claims anexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
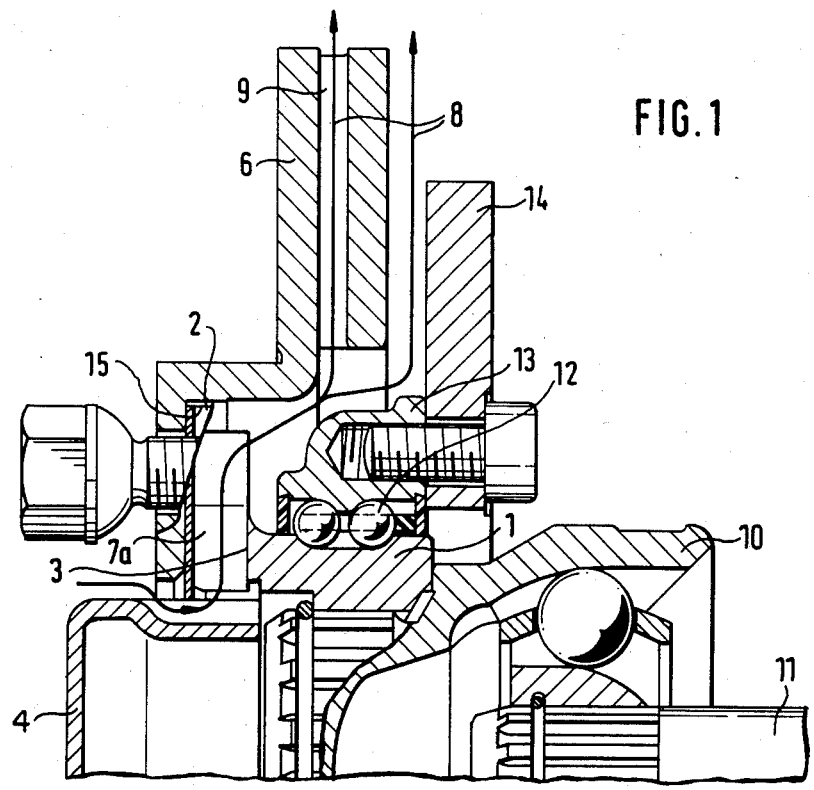
FIG. 1 is a partial axially extending sectional view through a wheel hub assembly embodying the present invention.

In FIG. 1 a portion of the wheel hub assembly is shown in axial section and includes a wheel carrier 14 on which an outer bearing ring 13 of a wheel bearing 12 is secured. Inwardly of the outer bearing ring is an inner bearing ring 1 which has a radially outwardly extending flange-like extension 2 containing radially extending slots 7 having side surfaces 3.

An internally ventilated brake disc 6 is secured either directly to the flange-like extension 2 by a screw connection or via a heat insulated cover disc 15. Accordingly, the combination of the slots 7 in the flange-like extension 2 and the cover provided by the radially inner portion of the brake disc 6 or the combination of the brake disc and the cover disc 15 define the cooling channels 7a for producing a ventilating effect in the wheel hub assembly.

For the transmission of torque, the inner bearing ring 1 is connected to a rotary constant velocity joint 10. The joint 10 has an inner part and an outer part with the inner bearing ring 1 connected to the outer part. The inner part of the joint 10 is connected to a drive shaft 11 so that it rotates with the drive shaft.

The inner bearing ring 1 has a central bore located radially inwardly of the flange-like extension 2 with a cover plate member 4 located in the central bore. The position of the cover plate member 4 within the bore can be seen in FIG. 2 with radially inwardly directed beads 5 formed in the cover plate member 4. As illustrated in FIG. 1, the cooling air flow enters the wheel hub assembly passing over the cover plate member 4 and entering the recesses formed by the beads 5. From these recesses, the air flow 8 passes through the cooling channels 7a defined between the flange-like extension 2 and the radially inner part of the brake disc 6, then passes over the outer bearing ring 13 and enters the apertures 9 in the radially outer part of the brake disc 6 and continues flowing outwardly over the internally ventilated brake disc. In addition, a part of the air flow passes between the brake disc 6 and the wheel carrier 14.

Figure 2:
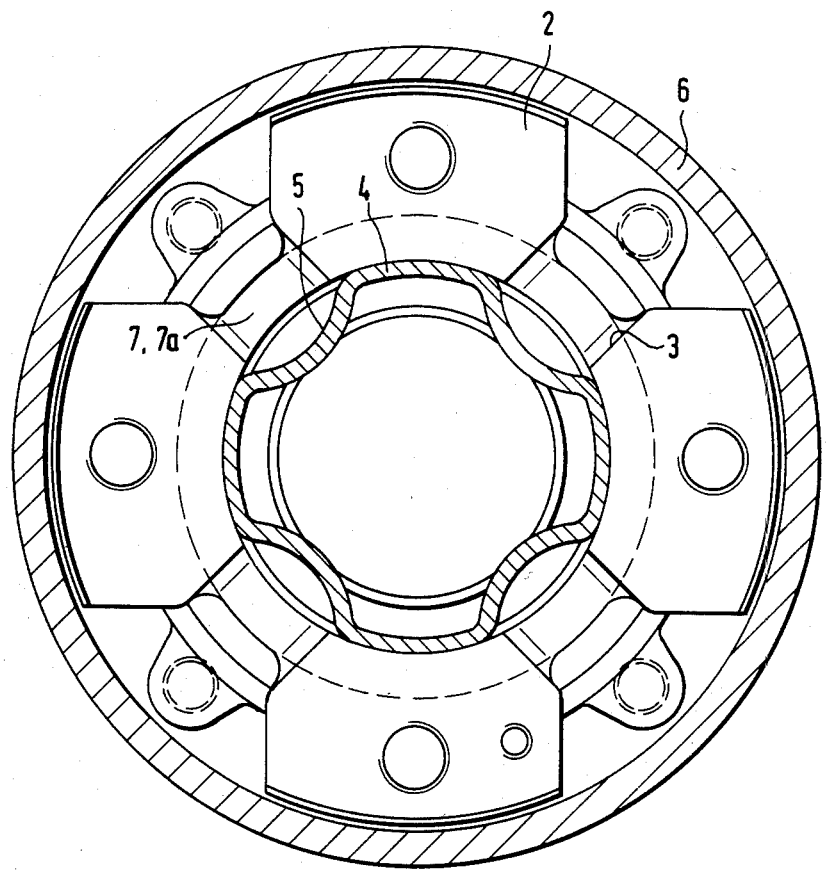
FIG. 2 is a view, partly in section, taken transversely of the view in FIG. 1 with the flange of the brake disc being shown in section.

In FIG. 2 the arrangement of the beads 5 in the cover cap or cover plate member 4 can be noted along with the arrangement of the flange-like extension 2 projecting radially outwardly from the inner bearing ring 1.

While specific embodiments of the invention have been shown and described in detail to illustrate the application of the inventive principles, it will be understood that the invention may be embodied otherwise without departing from such principles.

We claim:

1. A wheel hub assembly having a central axis and including a wheel hub, an integrated rotary constant velocity joint, and a flanged-on brake disc each encircling the central axis, comprising a wheel carrier, a wheel bearing encircling the central axis and comprising a radially outer bearing ring connected to said wheel carrier and a radially inner bearing ring, wherein the improvement comprises:

(a) said inner bearing ring having a first end and a second end spaced apart in the direction of the central axis, a flange-like extension formed on and extending radially outwardly from the first end of said inner bearing ring, said flange-like extension having a radially inner circumferential edge and a radially outer circumferential edge and uniformly circumferentially spaced radially extending through-slots formed therein and extending from the inner circumferential edge to the outer circumferential edge of said flange-like extension, and said brake disc being internally ventilated and mounted on the radially extending side of said flange-like extension most remote from said inner bearing ring;

(b) said through-slots in said flange-like extension being covered by said brake disc and the combination of said through-slots and said brake disc defining cooling channels extending radially outwardly from the inner circumferential edge of said flange-like extension; and (c) said inner bearing ring having a central bore therein located radially inwardly of said flange-like extension, a cover plate member inserted into the central bore of said inner bearing ring, said cover plate member has radially inwardly directed beads formed therein providing recesses aligned opposite the radially inner ends of the cooling channels located between said brake disc and said flange-like extension so that coolant can flow through the recesses formed by said beads into the cooling channels.

2. A wheel hub assembly, as set forth in claim 1, wherein a heat insulated cover disc is positioned between said brake disc and said flange-like extension for limiting the heat transmitted from said brake disc into said wheel hub assembly.

3. A wheel hub assembly, as set forth in claim 1, wherein said cover plate member is cap-shaped and forms a closure for the central bore of said inner bearing ring, said cover plate member has a first part extending transversely of the central axis and a second part extending circumferentially around said first part in the direction of the central aixs, and said beads are formed in said second part.

4. A wheel hub assembly, as set forth in claim 1, wherein said brake disc has radially extending apertures therethrough for effecting a ventilating effect and said apertures are located radially outwardly from and are arranged in flow communication with said cooling channels formed between said cover member and said flange-like extension.

* * * * *